(12) United States Patent
Mankaruse

(10) Patent No.: US 9,702,634 B1
(45) Date of Patent: Jul. 11, 2017

(54) WASTE HEAT RECOVERY AND OPTIMIZED SYSTEMS PERFORMANCE

(71) Applicant: Nagui Mankaruse, Huntington Beach, CA (US)

(72) Inventor: Nagui Mankaruse, Huntington Beach, CA (US)

(73) Assignee: AMERICAN INNOVATION CORPORATION, Huntington Beach, CA (US)

( * ) Notice: Subject to any disclaimer, the term of this patent is extended or adjusted under 35 U.S.C. 154(b) by 0 days.

(21) Appl. No.: 15/097,387

(22) Filed: Apr. 13, 2016

(51) Int. Cl.
| | | |
|---|---|---|
| *F28D 15/02* | (2006.01) | |
| *F24F 12/00* | (2006.01) | |
| *F24H 4/02* | (2006.01) | |
| *F25B 39/00* | (2006.01) | |
| *F24F 13/30* | (2006.01) | |
| *F25B 39/04* | (2006.01) | |
| *F28D 21/00* | (2006.01) | |

(52) U.S. Cl.
CPC .......... *F28D 15/0266* (2013.01); *F24F 12/00* (2013.01); *F24F 12/001* (2013.01); *F24F 13/30* (2013.01); *F24H 4/02* (2013.01); *F25B 39/00* (2013.01); *F28D 15/02* (2013.01); *F24F 2012/005* (2013.01); *F25B 39/04* (2013.01); *F25B 2339/042* (2013.01); *F28D 2021/0063* (2013.01)

(58) Field of Classification Search
CPC .... F28D 15/02; F28D 15/025; F28D 15/0266; F28D 15/06; F28D 21/0001; F24F 12/001; F24F 2012/005
See application file for complete search history.

(56) References Cited

U.S. PATENT DOCUMENTS

| | | | | | |
|---|---|---|---|---|---|
| 4,938,035 | A | * | 7/1990 | Dinh | F24F 1/022 62/279 |
| 5,333,470 | A | * | 8/1994 | Dinh | F24F 3/153 165/104.14 |
| 5,333,677 | A | * | 8/1994 | Molivadas | F03G 6/003 123/41.21 |
| 5,695,004 | A | * | 12/1997 | Beckwith | F24F 3/153 165/104.14 |
| 5,826,443 | A | * | 10/1998 | Ares | A47F 3/001 165/66 |

(Continued)

*Primary Examiner* — Ryan Reis

(57) ABSTRACT

Energy systems in different industrial applications including automotive applications experience between 20 to 50 percent of raw energy input as waste heat. in the form of hot exhaust gases, hot cooling water and lost heat from hot equipment surfaces including heated products. Continued efforts to improve systems energy efficiency, recovering waste heat losses provide attractive opportunities for reduced emission and less costly energy resources. This invention introduces other methods for higher performance of existing energy consuming systems by optimizing the performance of some of the system modules that contributes to the waste energy. in turn reduce energy consumption of these systems, reduces its operating cost, damages to the population health by reducing pollution improving the environment quality, and also reduces the cost of health care. Improving efficiency of the module's' which contribute large percentage of waste energy as by-product from the operation of these systems can improve the system efficiency.

18 Claims, 8 Drawing Sheets

(56) References Cited

U.S. PATENT DOCUMENTS

| | | | |
|---|---|---|---|
| 6,442,951 B1* | 9/2002 | Maeda | F24F 3/1423 |
| | | | 62/271 |
| 6,591,902 B1* | 7/2003 | Trent | F24F 1/0059 |
| | | | 165/104.14 |
| 2007/0163754 A1* | 7/2007 | Dionne | F28D 15/06 |
| | | | 165/104.21 |
| 2014/0283506 A1* | 9/2014 | Kuroki | F28D 15/025 |
| | | | 60/320 |
| 2015/0034270 A1* | 2/2015 | Kim | H05K 7/20745 |
| | | | 165/11.1 |
| 2015/0296665 A1* | 10/2015 | Cacho Alonso | H05K 7/206 |
| | | | 165/104.27 |
| 2016/0054073 A1* | 2/2016 | Rice | F28D 15/025 |
| | | | 165/104.24 |

* cited by examiner

WASTE HEAT RECOVERY AND OPTIMIZED SYSTEMS PERFORMANCE

BACKGROUND OF THE INVENTION

Field of the Invention

The invention disclosure relates to waste heat recovery to put excess heat to work, providing warmth to buildings or steam or process heating for chemical processing industry. Conserve valuable energy by extracting thermal energy from a waste stream and putting it to work in traditional design of operable energy systems in different applications and configurations, like refrigeration and air conditioning systems, internal combustion engines in automobiles, internet data centers, reversible waste heat recovery from some system energy consumption in agriculture for converting waste material into fuel and other useful products, and many other Industrial applications that generate waste heat as by-product. Using heat pipe technology in an innovative way in applications where waste heat recovery can provide additional substantial economical savings to the system operation. More efficient energy recovery by minimizing the delta temperature required between two process streams provided by using heat pipe technology and its low thermal gradient two-phase mode heat transfer. This enables higher levels of energy recovery, permits the use of smaller size and lower cost heat exchanger solutions in residential, commercial and power and chemical process industries applications. It also can provide improvement of waste heat recovery for any temperature.

Description of Related Art

Cooling generates considerable quantities of heat, if not utilized, this energy simply becomes waste heat. Current designs of air conditioning and refrigeration systems uses traditional modules of single phase designs of condensers in these systems along other control modules like control valves to regulate the direct utilization of waste heat. They provide exact demand-controlled heat recovery. The utilization of waste heat is profitable whenever heating and refrigeration are required in the same time, or where waste heat can be stored.

For example, in air conditioning systems to reheat dehumidified air; in butcheries, dairies, hotels, etc, where, on the one hand, cold storage rooms are operated and where on the other, there is always a great demand for domestic hot water; in shops, where in addition of cooling foodstuff, heat demand also occurs, e.g. mall heating; in cold storage facilities, for heating and domestic hot water; in industrial processes (e.g. drying processes); in data centers where, air or liquid cooling of the electronics and air condition the facilities generate higher temperature coolant in oil refineries plants and in chemical industrial processes.

SUMMARY OF THE INVENTION

In air conditioning and refrigeration systems, considerable energy savings is possible by rejected (waste) heat recovery using heat pipe condensers (Heat Pipe Heat Exchangers) in all condensers of the systems.

The air conditioning systems or refrigeration systems for large scale needs in industrial applications using separate type condensers. The heat pipe condensers used consist of a bundle of individual heat pipes with vaporizing and condensing sections at the respective ends, a separate type condenser works according to the same principals but it can achieve remote-heating exchange, and there by insulate the hot and cold fluid streams perfectly from each other, and allows mixed counter flow and parallel flow arrangements.

A single level separate type heat pipe condenser consisting of individual vaporizing and condensing sections at the respective ends FIG. 1) is a Schematic of Single-Level separate type heat pipe condenser and FIG. (2). is a schematic of Multilevel separate type heat pipe condenser.

Using the heat pipe condensers In large industrial applications for refrigeration and air conditioning systems can achieve additional value of up to 20% of the total waste heat to be recovered using heat pipe condensers compared to using traditional condensers in the specific segment of heat exchanged in each condenser.

The heat pipe heat exchanger used in waste heat recovery systems use groups of heat pipes arranged within an enclosure, the center of which is portioned or separate enclosure of each of the side of the hot and cold processes thermally connected.

In the case of the single level separate type heat pipe heat exchanger the center is partitioned, FIG. 4), high temperature fluid flows on one side, low temperature fluid flows on the other side. Thereby transferring the heat of the high temperature fluid to the low temperature fluid via fluid sealed in heat pipes. Since heat pipes have the capability to transport heat of appreciable distances, virtually isothermally, it is not necessarily to subdivide the original flow stream into interspersed multiple flow passages in a heat pipe in a heat pipe heat exchanger. Instead the original flow streams remain intact and separated in one enclosure in the case of single level separate type heat pipe heat exchanger or in two different enclosures as in the case of multi-layered separate type heat pipe heat exchanger, heat pipes in a group with at least one heat pipe extending through the common wall of the hot and cold side flow streams. Such an arrangement for a counter flow heat pipe heat exchanger as in FIG. 2), and FIG. 4).

As in conventional heat exchangers, fins may be added to the external surface of the heat pipes to increase the effective surface area. However the contribution of fins in augmenting the heat transfer area must be balances against the heat pipe group weight. Since it is not necessary to intersperse the cold and hot side flow streams in a heat pipe heat exchanger, heat transfer is accomplished with little or no disruption or diversion of the flow streams. Inlet and outlet flow distribution plenums will be considerably simplified or may not be needed at all. Complete separation of the fluid streams like in the case of multiple separate type heat pipe heat exchanger can be particularly advantageous when the hot and cold side fluids are chemically reactive, and mixing of the streams in the event of leak must be avoided. The heated pipes in a heat pipe heat exchanger are arranged in stages, each stage consisting of a single row of heat pipes, all of which are of the same temperature. The heat pipe temperature changes from stage to stage, varying from a minimum value at one end of the heat pipe heat exchanger to a maximum value at the other end. If a temperature range is large enough, more than heat pipe fluid could be required to ensure adequate heat transport capability in all stages. The required heat transfer area for a given heat transfer rate decreases as the number of stages is increased, but the pressure drop of the hot and cold side fluids also increases with the number of stages. Therefore pressure drop limitations may establish the maximum number of stages and the minimum heat transfer area.

In a heat pipe heat exchanger, the core volume and weight are proportional to the sum of the hot side (evaporator section) area and the cold side (condenser section) area. In an un-finned conventional heat exchanger in which one fluid flow inside tubular flow passages and the other fluid flows outside these passages, the hot and cold side areas are virtually equal and extend over the same length. The core volume and weight are then proportional to the hot or the cold side areas, rather than their sum. Therefore, in comparing the heat transfer area of un-finned heat pipe and conventional heat exchangers, the outside surface area of the heat pipes should be compared to the hot or cold side area of the conventional heat exchanger flow passages. Depending on specific design circumstances, a heat pipe heat exchanger may be larger or smaller than a conventional heat exchanger with the same heat transfer rate where the efficiency, is the effectiveness, and the heat transfer coefficient, and the thermal resistance of the heat pipe, which include the resistance due to the heat pipe wall and wick as well as the resistance due to the evaporation and the condensation due to the heat pipe working fluid. The convection heat transfer coefficient s is highly dependent on surface geometry, flow conditions and fluid properties. There are two main approaches in the design of heat pipe heat exchanger; the log-mean temperature difference model (LMTD), and the effectiveness-number of transfer units model.

The advantages of this invention are all a direct result of using first, the heat pipes (FIG. 3) and its two-phase technology of individual heat pipes in groupe(s). The heat pipe technology allows heat transfer with an extremely high and effective thermal conductivity. As a passive device evacuated sealed vessels with partial amount of fluid inside heat pipes to carry the heat from hot side area to cold side area. The heat pipe is a heat transfer device with extremely high effective thermal conductivity. Heat pipes are typically circular in cross sections, but it can be flat (Vapor Chamber) which are back-filled with a small quantity of a working fluid. They are totally passive and are used to transfer heat from a heat source (hot side) to a heat sink (cold side) with minimal temperature gradients. They are also used to isothermalize surfaces. Heat pipes transfer heat by the evaporation and condensation of a working fluid. As heat is input at the evaporator, fluid is vaporized, creating a pressure gradient in the pipe. This pressure gradient forces the vapor to flow along the pipe to the cooler section where it condenses, giving up its latent heat of vaporization. The working fluid is then returned to the evaporator by capillary forces developed in the porous wick structure or by gravity. The heat pipe group is individual heat pipes used in this invention utilizes working fluid range from ammonia, water, acetone and methanol, and several other fluids depending on the temperature range of the system operation between hot side and cold side. The heat pipe heat exchanger is efficient with high heat transfer density. Other heat pipes type are also be used like but not limited to; pulsating heat pipes, depending on the application, temperature limits, heat pipe heat exchanger capacity and weight, size, etc.

BRIEF DESCRIPTION OF THE DRAWINGS

The accompanying drawings illustrate the present invention. In such drawings.

DETAILED DESCRIPTION OF THE INVENTION

Figure 1:
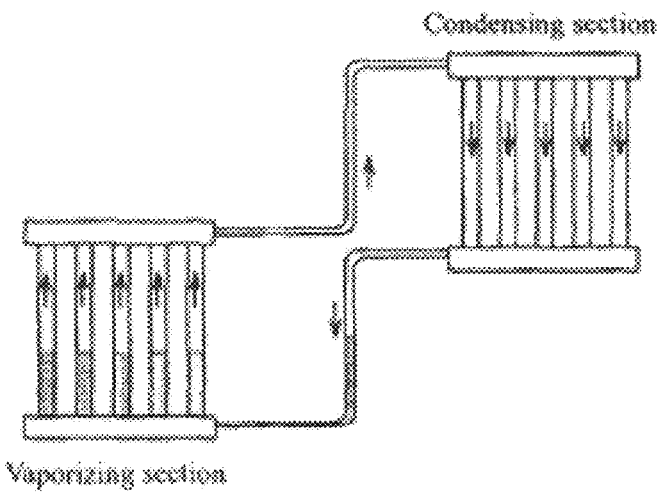
FIG. 1. is Single-level separate type Heat Pipe Heat Exchanger
Figure 2:
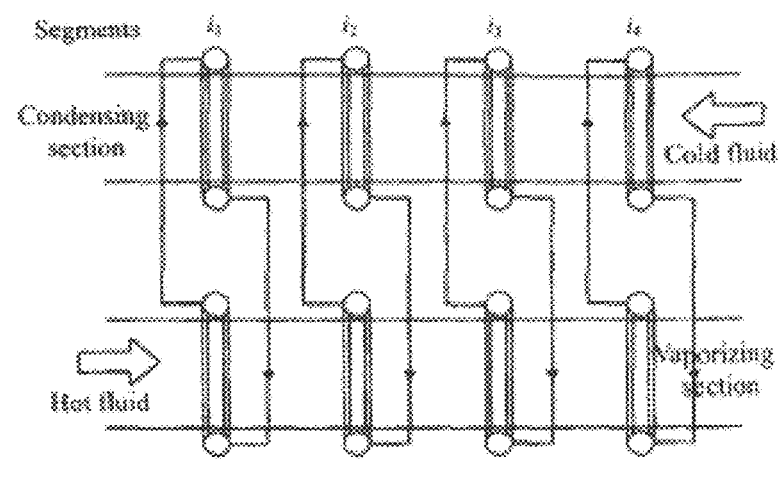
FIG. 2. is Multi-level separate type Heat Pipe Heat Exchanger
Figure 3:
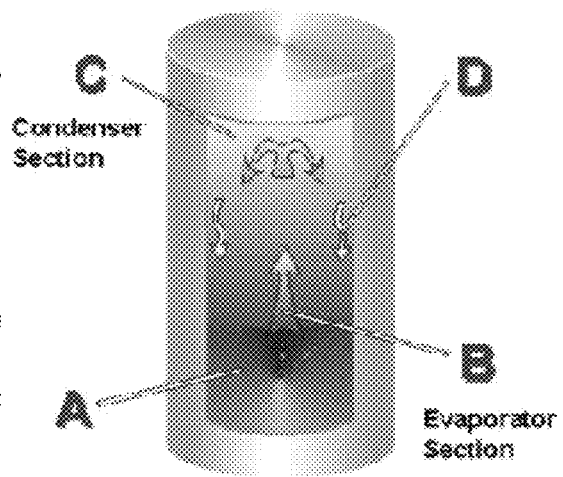
FIG. 3. is a conventional Heat pipe
Figure 3:
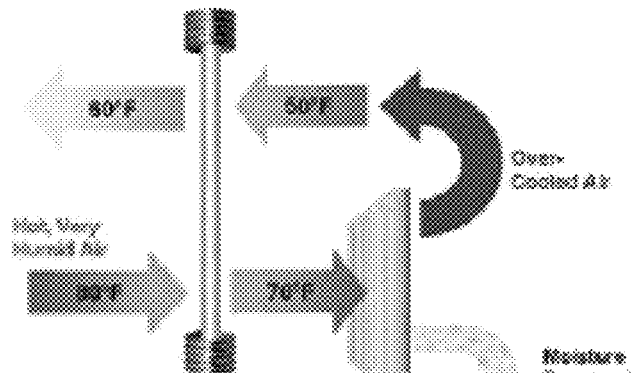
Figure 4:
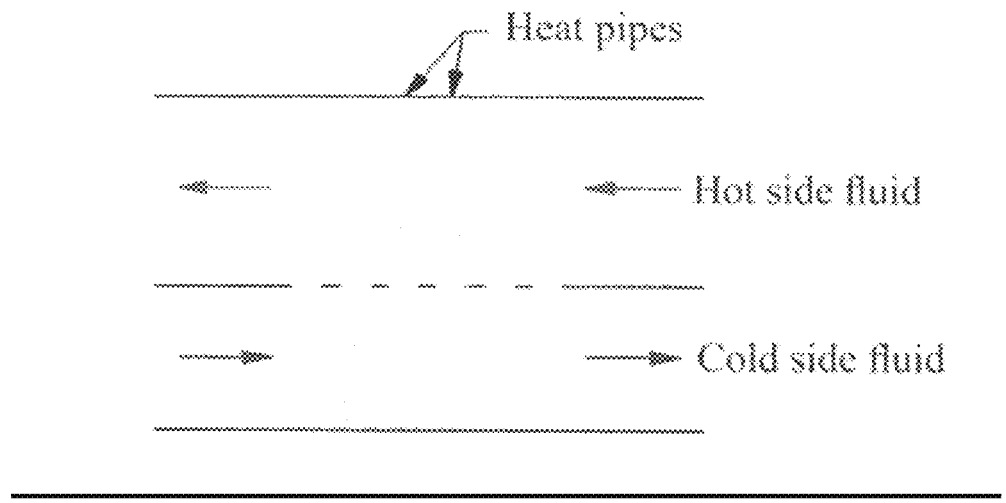
FIG. 4. Is Heat pipe Heat Exchanger-counter flow configuration
Figure 5:
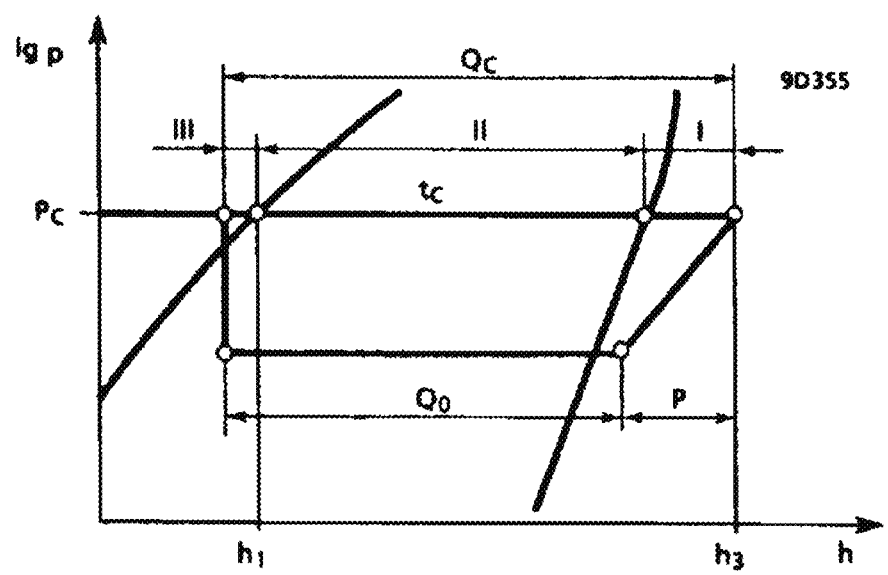
FIG. 5. Is a Refrigeration Cycle on Pressure (P) Enthalpy diagram (h).

The invention relates to improving the efficiency of waste heat recovery of large scale refrigeration and air conditioning systems. This also can be applied to other industrial systems in different applications that use heat rejected in the process. The heat rejected in any process to a coolant is mainly can be considered waste heat unless it is recovered from a heat pipe condenser or heat pipe heat exchanger or used in other process or saved any form of energy. In the refrigeration system with hot gas diversion of FIG. 6
Heat Supply of the Condenser:

The heat absorbed in the evaporator Qe and the compressor P in the form of heat must be released again in the heat pipe condenser. Instead of dissipating this heat quantity Qc to the environment, appropriate measures can be implemented in order to put the heat flow to meaningful use for heating purposes because of the temperature level. The condenser's output Qc depends mainly on the refrigerant volume V circulated per unit time and on the enthalpy difference h3–h1 at a given pressure Pc. The liquiefaction of the hot refrigerant vapor takes place in several stages (FIG. 5).

In the initial phase (I), heat is extracted from the hot compressed gas (e.g. 90 degrees C.) from the compressor. The extracted heat amounts to 10-20% of the total condenser output. This heat has considerably higher temperature level (up to 60 degrees C.), it is particularly suitable for heat recovery if the required heating media temperature is higher than the condenser temperature, and the extracted heat alone can cover the heat demand.

The actual condensation then occurs in a second phase (II). The temperature of the recoverable heat here corresponds to the condensation temperature tc.

The final phase (III) in the heat pope condenser produces of the sub-cooling of the now already condensed refrigerant. Due to the low temperature and energy content, this zone is hardly relevant for heat recovery.

The condensation temperature and pressure vary with changing ambient conditions, especially in the case of air cooled condensers. Therefore, it is recommendable to limit the condense pressure to a minimum.

It is also worth checking whether it is worthwhile raising the condensation temperature during the heating season.

Gas-Side Heat Recovery

The condenser heat can be utilized in several ways. Gas-side heat recovery methods have several major advantages over other solutions. Direct use of the condensation heat usually provides a higher temperature and heat yield than conventional, indirect heat exchange methods.

The three port valve for gas side control permits a simplification of the hydraulic circuit on the consumer side, especially in the case of re-heating of the heating medium above the condensation temperature (hot water heating systems with electric water heaters). Three port valves prevent the occurrence of undesirably high pressures in the condenser at high return temperatures. Thus increasing operational safety at little expense.

Gas-side heat recovery takes place in auxiliary heat pipe condensers. They can be connected to the main heat pipe condenser via various circuits. Three basic configurations is explained bellow.

Condenser Connected in Series

Figure 8:
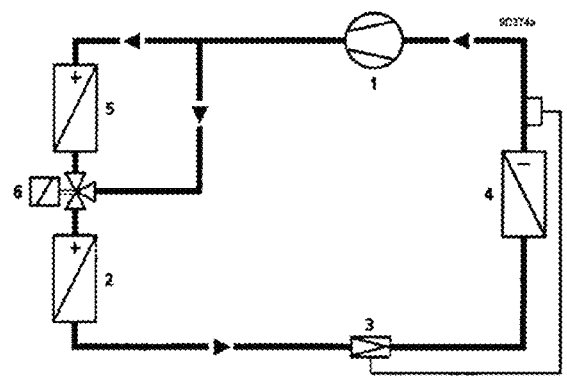
FIG. 8. Is a schematic of Refrigeration System with condensate side control valve (condensers connected in series)
 1. Compressor, 2. Main Condenser, 3. Expansion Valve, 4. Evaporator 5. Auxiliary Condenser, 6. Condensate Valve.

If an auxiliary heat pipe condenser is connected upstream of the main heat pipe condenser for the purpose of heat recovery, the term series-connected condensers is used (FIG. 8).

The configuration is selected especially if the auxiliary heat pipe condenser is used for heating domestic hot water whose temperature is higher than the heat pipe condenser temperature.

This is achieved by using extracted heat. The achievable water temperature depends on the size of the auxiliary heat pipe condenser downstream from it.

If the auxiliary heat pipe condenser is used for reheating the air in an air conditioning system with dehumidification.

If the heat recovery heat pipe condenser should have a higher condensation temperature than the main heat pipe condenser with the aid of additional pressure control.

If an existing system with ON/OFF control is equipped with a re-heater controlled in modulating mode as an auxiliary heat pipe condenser in order to modulate the temperature progression in the supply air duct.

In the case of series heat pipe condensers, the pressure loss in the heat pipe condensers and refrigerant pipes accumulate. Therefore, the pressure loss between the compressor and the refrigerant collector must not be too great, otherwise the efficiency of the system suffers.

Condensers Connected in Parallel

Figure 6:
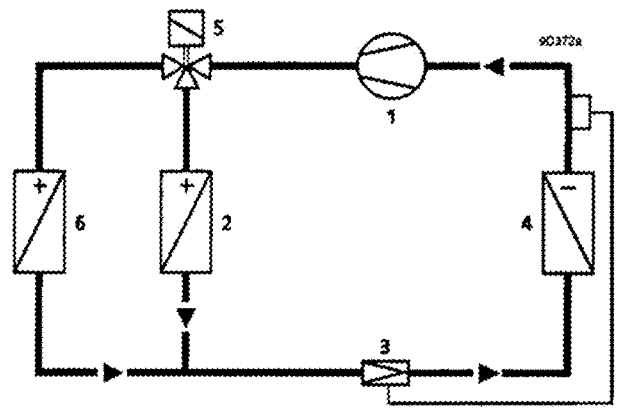
FIG. 6. Is a schematic of Refrigeration System with Hot Gas Diversion (condensate (condensers connected in parallel)
 1. Compressor, 2. Main Condenser, 3. Expansion Valve, 4. Evaporator, 5. Heat-gas diverting valve, 6. Auxiliary Condenser.
Figure 7:
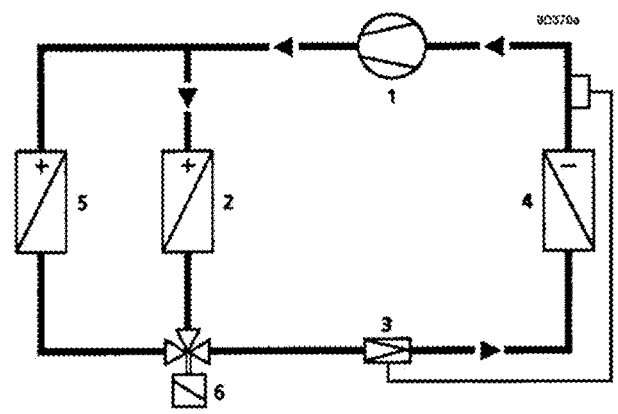
FIG. 7. Is a schematic of Refrigeration System with condensate side control valve (condensers connected in parallel)
 1. Compressor, 2. Main Condenser, 3. Expansion Valve, 4. Evaporator 5. Auxiliary Condenser, 6. Condensate Valve.

If the auxiliary heat pipe condenser is configured alongside the main heat pipe condenser and supplied simultaneously with the same gas. This is a parallel connection of the heat pipe condensers (FIG. 6). This is usually used where:
  Both condensers have relatively large pressure drop, be it due to long pipe runs or due to a great pressure loss in the condenser itself.
  Multiple condensers are used for heat recovery like domestic hot water heating and air heating in the retail are and butchery.

In the case of parallel heaters connection, the pressure losses are divided among the heat pipe condensers similar to electrical resistors that are connected in parallel. Therefore such systems are especially efficient.

What series a parallel heat pipe condensers have in common is the fact that the heat pipe condenser that is shut down in each case is partially or fully flooded with refrigerant, regardless of its supply control. This occurs until the heat pipe condenser at the lower ambient temperature is flooded to such an extent that the pressure is equalized between the condensers.

This must be taken into account in the construction or conversion of the refrigeration system. The quantity of refrigerant required to flood the heat recovery heat pipe condenser must, therefore, be made available in a correspondingly larger refrigerant collector.

Combined Condenser Circuits

If sufficient condenser output is centrally available, combination series and parallel connected heat pipe condensers are also conceivable. Such combinations are specially used where several, often different heat consumers use the heat pipe condenser heat.

Modulation Control of Several Condensers

The modulation valve can basically be configured in two different ways.
  a-Hot gas side diverting control
  b-condensate side mixing control Hot Gas Side Diverting Control In the case of the refrigeration system of FIG. 6 the control valve is located in the hot gas flow. It proportions the gas flow according to the heat demand on the auxiliary heat pipe condenser. The control system detects the heat demand on the heat recovery auxiliary heat pipe condenser where it occurs (rooms, central air treatment plants, etc.) and converts it to the manipulated variable for the control valve. The output of the heat pipe condenser condensers determined by the gas flow volume at the respective valve position.

The advantage of the hot gas diversion for control is this control element configuration giving rise to the rapid reaction to control components. Therefore, hot gas diversion is used in cases where fast and particularly accurate control is needed. The examples of use is in process control of a drying plant, control of air side reheating, accurate and fast temperature control of domestic hot water heating systems.

The valve installed on the hot gas side gives rise to a residual pressure loss p, in a pressure pipe.

Gas side heat recovery takes place in in auxiliary heat pipe condenser. They can be connected to the main heat pipe condenser via various circuits.

Condensate Side Mixing Control

The condensate side control valve mixes the condensate flows according to the demand in the case of parallel connected of heat pipe condensers (FIG. 6,) in case of heat demand, the three port mixing valve opens the condensate pipe of the heat recovery heat pipe condenser and simultaneously closes that of the main heat pipe condenser. The heat recovery heat pipe condenser is drained of condensate, and the output increases according to the heat transfer surface area that is exposed.

Auxiliary heat pipe condenser controlled in modulating mode that is connected in series (FIG. 8) with the main heat pipe condenser function in a similar manner in this case the condensate leaving the auxiliary heat pipe condenser is controlled, and bypass directly to the valve.

This application is used frequently, especially in air conditioning systems with dehumidification and reheating. Both condensate side control methods (FIG. 6 and FIG. 8) provide for precise modulating demand controlled heat recovery systems.

Condensate side control is slightly slower than direct hot gas control, so it is particularly suited for domestic hot water heating and for room heating purposes. In terms of the refrigeration machine energy balance, it is slightly more efficient of the two solutions, all the more since no more disadvantageous pressure losses (Pv) reduces the confident of performance, because the valve is installed between the heat pipe condenser and the expansion valve. On the condensate side valves can control heat pipe condenser output of up to 1,000 kW.

Preheating Outside Air

Figure 9:
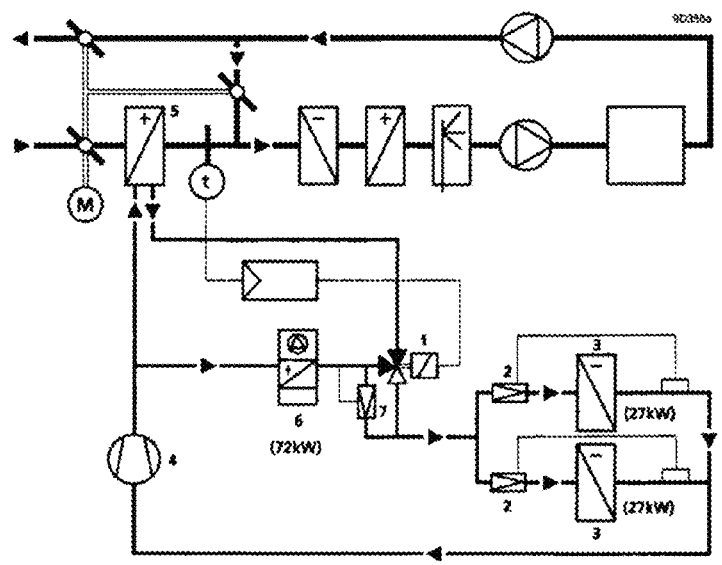
FIG. 9. Is a schematic of Heat Recovery System for Preheating outside air
 1. Control valve, 2. Expansion valve, 3. Evaporator, 4. Compressor, 5. Auxiliary Condenser, 6. Main Condenser, 7. Overflow valve FIG. 10. is a simplified schematic of the reheating of dehumidified supply air
 1. Compressor, 2. Auxiliary Condenser, 3. Heat recovery control valve, Evaporator, 4. Main condenser, 5. Expansion valve 6. Main Condenser, 7. Suction throttling valve, 8. Shift controller FIG. 11. is a sketch of dehumidification process on the psychometric chart FIG. 12. is a simplified schematic of Grain drying plant
 1. Sir cooling coil, 2. Re-heater, 3. Auxiliary condenser, 4. Main condenser, 5. By-pass pipe, 6. Compressor, 7. Evaporator, 8. P. Controller. 9. PIO Controller FIG. 13. is a simplified schematic of Integrated heat recovery system large food shop
 1. Compressor, 2. Storage tank, 3-5 Auxiliary condensers, 6. Main condenser, 7. Evaporator, 8. Heat recovery control valve.

The air conditioning system of a shopping center operates with the four basic functions: heating, cooling, dehumidifying and humidifying. Before the cold outside air is ducted to the mixing chamber, it is preheated to a given demand dependent value. The pre-heater is supplied by the heat pipe condenser of the refrigeration machine used for the cold storage and freezing rooms instead by oil, gas or electricity. (FIG. 9)

An overflow valve between the main heat pipe condenser and the refrigerant collector provides for reliable circulation in all load cases. A valve of this kind is especially necessary for large heat pipe condensers. In case of great heat demand on the heat recovery heat pipe condenser, the control valve closes the liquid pipe of the main heat pipe condenser. This causes increasing proportions of gas to flow onto the heat recovery heat pipe condenser. It is not completely condensed there, the pressure of the overflow valve is reached there, refrigerant drain from the main heat pipe condenser. It is then provides the residual condensation. The closer the opening pressure is to the maximum permissible operating pressure, the greater the heat yield becomes because of the higher condensation temperature. Without heat recovery, the refrigeration machine operates at the original lower pressure level again. This provides an ideal way of minimizing operating costs for cooling and heat production.

Reheating Dehumidified Supply Air

Dehumidification of supply air always involving cooling, which makes reheating necessary. The heat that occurs in the condenser can be used for that purpose.

Figure 10:
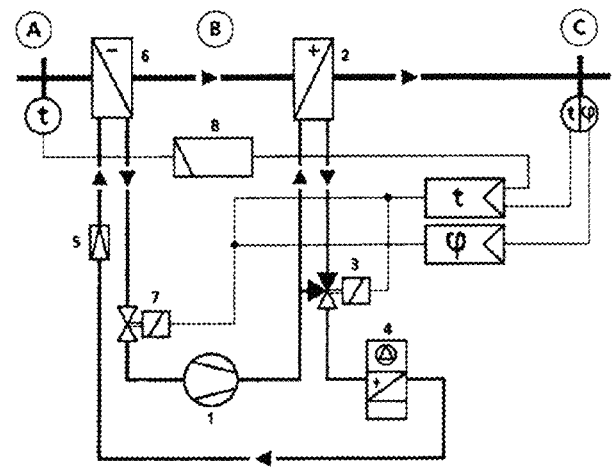

Reheating using fuel or electricity is expensive in comparison. (FIG. 10) shows a schematic of a system with a direct expansion evaporator and a heat recovery auxiliary heat pipe condenser as a re-heater. The evaporator (6), cools the air down. The auxiliary heat pipe condenser (2), provides reheating of the air after dehumidification. The auxiliary condenser and main condenser are connected in series.

Figure 11:
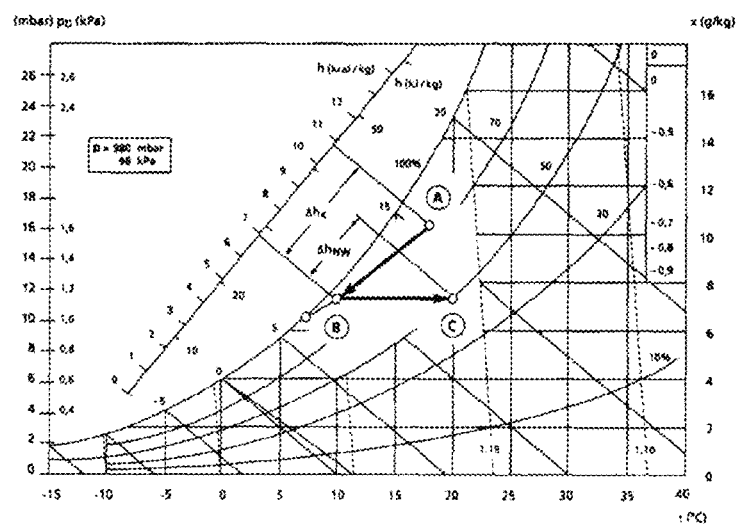

In (FIG. 11) the Psychometric Chart) shows the dehumidification process takes place between points A and C. Air at tau=18 degrees C., and relative humidity=75% (point A) is dehumidified and reheated to tau=20 degrees C. and relative humidity.=50% (point C)

Outside air conditions like these prevail frequently in moderate climate zones. In rainy days during intermediate seasons. The process passes through point B. where the air has the desired water content (×7.5 g/kg) but a temperature of only 10 degrees C. so it must still be heated by further 10 K. This function is provided by the auxiliary heat pipe condenser, in which a portion of the hot gas condenses.

The three port valve controls the amount flowing auxiliary heat pipe condenser. It mixes the condensate the hot gas. The remaining gas condenses in the main heat pipe condenser. If the auxiliary heat pipe condenser has no heat demand, all of the hot gas flows via the main heat pipe condenser, whereas the auxiliary heat pipe condenser floods with condensate and becomes inactive.

The suction valve (7), downstream from the evaporator controls the refrigeration capacity according to the controller signals for temperature and dehumidification if the dehumidification causes the supply air temperature to fall below the low limit, the heat recovery control valve (3), opens the condensate drain pipe, which starts the re-heater according to demand. A shift controller 8, for summer and winter compensation influences the set point of the controlled temperature.

Heat Recovery in Drying Plants

Figure 12:
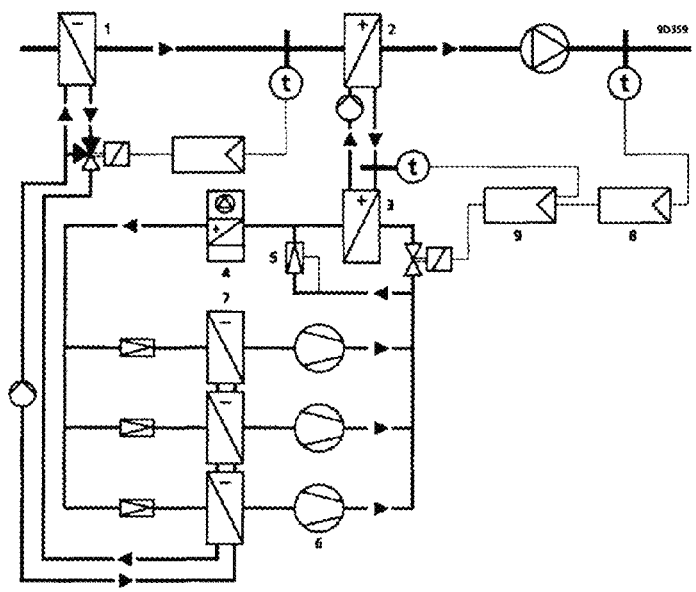

A gas n drying plant (FIG. 12) has been selected as an example. The air cooled coil (1), is supplied by indirect refrigeration cycle. Its primary task is air dehumidification. The dehumidified air is then heated to a given temperature that is appropriate to the grain. This is done by the re-heater (2), using the waste heat from the refrigeration machine. The heat from the auxiliary heat pipe condenser (3), is transported to the reheater via an intermediate circuit.

The auxiliary heat pipe condenser is connected in series with the main condenser (4), and controlled on the gas side. The bypass pipe (5), of the auxiliary heat pipe condenser is pressure controlled and serves as an overflow if the control valve is closed. The use of the waste heat is meaningful, because the heat available in the auxiliary heat pipe condenser coincides with the demand in terms of time, temperature and quantity.

Because grain quickly goes bad under unsuitable climate conditions, the temperature and humidity must work very precisely. Overheating of the supply air due to control overshoots must especially be avoided. in the system, three compressors, which are started or stopped according to refrigeration demand, give rise to major load\ variations in the auxiliary condenser and, therefore in the re-heater. The cascade control (8), and (9), attenuate these variations and keeps the supply air to the heater at a constant temperature.

The primary controller (F) acquires the air temperature after the air heating coil via the sensor. It generates the input signal for the auxiliary controller (PID) from the difference between the set point and actual value. It is the auxiliary controller that acts on the control valve according to the difference between the values acquired in the water supply and its respective set point, which is assigned by the primary controller. Since the control valve is installed on the hot gas side, the auxiliary control loop acts correspondingly fast.

Food Shop with Integrated Heat Recovery

Figure 13:
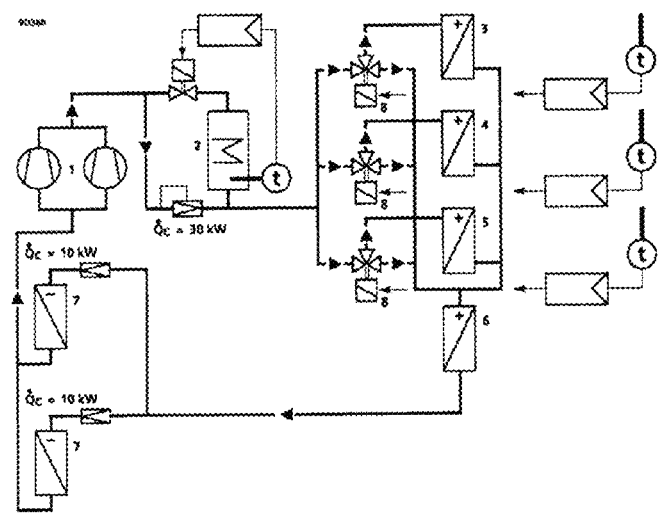

In a relatively large food shops, very different heat sources and heat losses are active at the same time (FIG. 13).

In the butchery department, the display is cooled and is subject to relatively high humidity, where the retail area usually has to be heated at the same time.

The same applies to all retail areas, where cooled and frozen goods are sold. In the warehouse and retail areas, the external loads (condition, ventilation losses, etc.) and internal loads (persons, lighting, etc.) very greatly overtime. Additionally, the consumption of hot water is continually high.

The ventilation system covers the main heating load in the retail area, butchery department and warehouse. Experience shows that heat recovery systems of this kind can cover up to 90% of the total heating load.

Heat Recovery System

The refrigeration machine supplies in site refrigerated cases and refrigerated display cabinets. It is continually in operation. Therefore heat is continually produced. Upstream of the main heat pipe condenser, auxiliary heat pipe condensers are serving as air heating coils are connected in parallel and controlled on the hot gas side. They are individually controlled by means of modulating three-port valves.

The excess gas in each case is supplied to the main heat pipe condenser via a manifold. in order to utilize the extraction from the hot gas, a domestic hot water heater heat pipe heat exchanger is connected upstream in series. If the control valve for domestic hot water heating is closed, the hot gas flows directly to the heat recovery heat pipe condenser via the bypass. If there is no heat demand at any of the consumers, the gas flows through the diverting control valve and manifold to the main heat pipe condenser.

Condensate pressure controllers ensure that a minimum condensation pressure and temperature are maintained. They also prevent mutual interference of the condensate flow.

The bypass pipe between the compressor collectors provides the minimum necessary pressure kin the refrigerant container during startup.

Control

Figure 14:
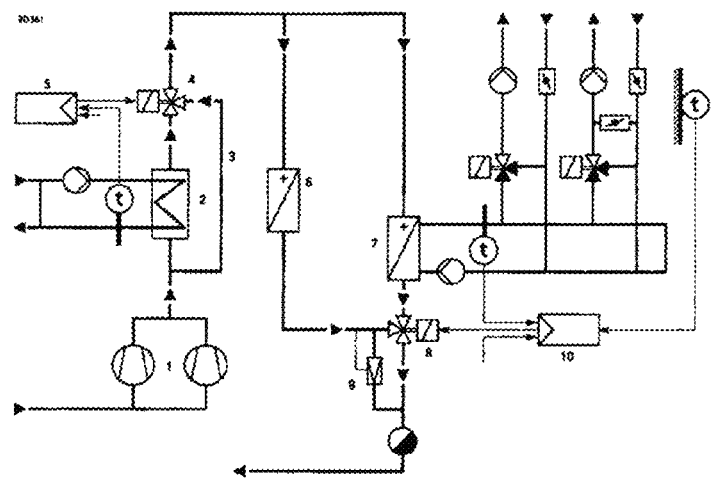
FIG. 14. is a schematic of heat recovery for low temperature heating
 1. Compressor, 2. Heat exchanger, 3. By-pass pipe, 4. Mixing valve, 5. Temperature controller, 6. Main condenser, 7. Auxiliary condenser, 8. Control valve, 9. Overflow valve, 10. Heating controller.

Since the heat demand of each consumer varies, individual control loops for each heat recovery unit match the heat supply to the respective demand. This solution offers the advantage that the heat consumers are operated in conjunction with the refrigeration machine according to the criteria of comfort and economy Low Temperature Heating Via Waste Heat Utilization In the refrigeration system in (FIG. 14) the refrigerant that is heated by the refrigeration process is used to heat domestic hot water and to supply the low temperature heating system. The system is installed in butchery and a shop and resident Operating Principle The hot gas supplied by the compressors flows directly into a special heat pipe heat exchanger for domestic hot water heating. The achievable hot water temperature can be up to 60 degrees centigrade depending on the capacity of the auxiliary heat pipe condenser (heat pipe heat exchange), the degree of heat extraction and condensation and on condensation pressure. The water is reheated in an auxiliary storage tank. The heat output of the heat pipe heat exchanger is controlled by the mixing valve (4), which is used as condensate back pressure valve in this case. At partial loads and in case of high return temperatures in the domestic hot water circuit, the hot gas flows directly to the main and auxiliary heat pipe condensers via the bypass (3) and mixing valve. This means that distribution on the high pressure side of the refrigeration machine cannot occur even in case of high return temperatures in the domestic hot water system.

Figure 15:
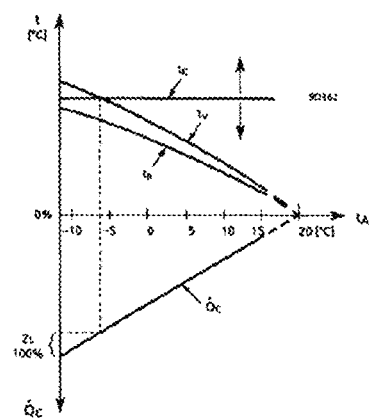
FIG. 15. Heating Curve and Heat Output

The refrigerant flows (FIG. 14) to the main heat pipe condenser (6) and auxiliary heat pipe condenser (7) in proportion to the mixing valve (8) The latter is actuated by the controller (10), which controls the heating system supply temperature. The control action is achieved via the backing up of the condensate (FIG. 15).

If no heat demand is detected, the mixing valve is closed to the heating heat pipe condenser, completely flooding the auxiliary heat pipe condenser. The condensate assumes the temperature of the heating medium. At the same time the hot residual gas is supplied to the air cooled main heat pipe condenser via the manifold. Here the heat is dissipated to the environment.

As soon as heat demand occurs, the mixing valve reduces the flow of refrigerant to the main condenser. It floods and its output is continuously reduced. On the other hand, the valve opens the outlet of the heating heat pipe condenser is drained according to the heat demand. The over (9) controls the condensation pressure.

Those skilled in the art will appreciate the many benefits and advantages afforded by the present invention. Of particular importance the straightforward modular design of the systems performances and optimization. This minimizes operating cost, not only through the inexpensive assembly process employed, but throughput the assembled systems and operation for the life of the plant.

Applications of this invention can extend to waste heat recovery in different industries such as oil refinery, electrical power generation plants, many of process industries that consumes big amounts of energy like cement production industries, fertilizer industries, food processing industries and many other industries.

While the invention has been particularly shown and described with reference to the preferred embodiments thereof, it will be understood by those skilled in the art that various changes in form and detail may be made therein without departing from the spirit and scope of the invention.

I claim:
1. A multi-phase waste-heat recovery system comprising:
    a. one or more condensers;
    b. one or more evaporators;
    c. one or more compressors producing hot gas having heat energy, wherein the one or more compressors is in communication with the one or more condensers and the one or more evaporators;
    d. a plurality of heat pipe condensers, wherein the heat energy flows through heat pipes to a heat pipe heat exchanger within the plurality of heat pipe condensers, wherein a size of at least one auxiliary heat pipe heat exchanger determines achievable water temperature;
    e. a plurality of valves in communication with a hydraulic circuit,
    wherein the heat energy is extracted from the compressor in an initial phase, wherein the heat energy corresponds to a condensation temperature, wherein the compressed gas is condensed in a second phase, and wherein the condensed compressed gas is directed through the hydraulic circuit.
2. The system of claim 1, wherein water is reheated in an auxiliary storage tank, wherein one of the plurality of valves is a mixing valve in communication with the heat pipe heat exchanger, wherein the mixing valve controls refrigerant flow within at least one of the plurality of heat pipe condensers, wherein the mixing valve operates based on the detection of a demand for heat.

3. The system of claim 2, wherein the system is arranged in multiple levels each having a separate system, wherein the separate systems are connected to one another.

4. The system of claim 3, wherein the separate systems are connected in either a parallel or series circuit.

5. The system of claim 2, wherein the heat pipe heat exchanger comprises multiple levels each having a heat pipe heat exchanger, wherein each of the multiple levels are connected to one another.

6. The system of claim 1, wherein the heat pipe heat exchanger is configured for couterflow heat exchange.

7. The system of claim 1, wherein the heat pipe heat exchanger is configured for parallel flow heat exchange.

8. The system of claim 1, wherein fluid leaves the one or more evaporators to a super heater to enter the one or more compressors as super-heated gas.

9. The system of claim 1, wherein the heat pipe heat exchanger is connected with at least one auxiliary heat pipe heat exchanger.

10. The system of claim 1, wherein the heat pipe heat exchanger is thermally connected with a main heat pipe heat exchanger, wherein the thermal connection is in parallel with the main heat pipe heat exchanger, wherein the main heat pipe heat exchanger condenser heats domestic water using recovered heat.

11. The system of claim 10, wherein the main heat pipe heat exchanger is connected with the at least one auxiliary heat pipe heat exchanger when a sufficient amount of condensate is output.

12. The system of claim 11, wherein the at least one auxiliary heat pipe heat exchanger reheats air in a dehumidification air conditioning system.

13. The system of claim 11, wherein the heat energy of the main heat pipe heat exchanger condenser has a higher condensation temperature than the at least one auxiliary heat pipe heat exchanger, wherein the system further comprises a re-heater to modulate temperature progression.

14. A multi-phase waste-heat recovery system comprising:
 a. two or more condensers;
 b. two or more evaporators;
 c. one or more compressors producing hot gas having heat energy, wherein the one or more compressors is in communication with the two or more condensers and the two or more evaporators;
 d. a plurality of heat pipe condensers, wherein the heat energy flows through heat pipes to a heat pipe heat exchanger within the plurality of heat pipe condensers, wherein a size of at least one auxiliary heat pipe heat exchanger determines achievable water temperature, wherein two types of heat exchangers are in communication with the plurality of heat pipe heat exchangers; and
 e. a plurality of valves in communication with a hydraulic circuit,
 wherein each of the two or more condensers, the two or more evaporators, and the two types of heat exchangers are disposed within separated layers, wherein each of the separated layers are connected to one another, wherein the heat energy is extracted from the one or more compressors in an initial phase, wherein the heat energy corresponds to a condensation temperature, wherein the compressed gas is condensed in a second phase, and wherein the condensed compressed gas is directed through the hydraulic circuit.

15. The system of claim 14, wherein one of the two types of heat exchangers exchanges heat through a parallel flow process.

16. The system of claim 14, wherein one of the two types of heat exchangers exchanges heat through a counter flow process.

17. The system of claim 15, wherein the two or more condensers are configured either as multilevel separate type heat pipe heat exchangers or as single-level separate type heat pipe heat exchangers.

18. The system of claim 16, wherein the two or more condensers are configured either as multilevel separate type heat pipe heat exchangers or as single-level separate type heat pipe heat exchangers.

\* \* \* \* \*